US010510061B2

(12) United States Patent
Chan (10) Patent No.: US 10,510,061 B2
(45) Date of Patent: Dec. 17, 2019

(54) SYSTEM AND METHOD FOR CAPTURING USER INPUTS IN ELECTRONIC FORMS

(71) Applicant: BlackBerry Limited, Waterloo (CA)

(72) Inventor: Eric Chan, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/713,436

(22) Filed: Sep. 22, 2017

(65) Prior Publication Data

US 2018/0075433 A1 Mar. 15, 2018

Related U.S. Application Data

(63) Continuation of application No. 12/393,920, filed on Feb. 26, 2009, now abandoned.

(51) Int. Cl.
  *G06Q 20/32* (2012.01)
  *G06Q 30/06* (2012.01)

(52) U.S. Cl.
  CPC ......... *G06Q 20/32* (2013.01); *G06Q 30/0601* (2013.01)

(58) Field of Classification Search
  CPC .......................... G06Q 20/32; G06Q 30/0601
  See application file for complete search history.

(56) References Cited

U.S. PATENT DOCUMENTS

| 6,192,380 | B1 * | 2/2001 | Light | G06F 17/243 |
| | | | | 707/999.009 |
| 6,595,342 | B1 * | 7/2003 | Maritzen | G06Q 20/02 |
| | | | | 194/212 |

(Continued)

FOREIGN PATENT DOCUMENTS

| CA | 2693710 | 8/2010 |
| CN | 101847139 | 9/2010 |
| EP | 2224348 | 9/2010 |
| WO | 2009111856 | 9/2009 |

OTHER PUBLICATIONS

Summons to attend oral proceedings pursuant to Rule 115(1)EPC, EP No. 09153764.7 dated May 3, 2018.
Chinese Office Action dated Mar. 2, 2015, received for Chinese Application No. 201010176686.1.
Chinese Office Action dated Aug. 25, 2011, received for Chinese Application No. 20111082200648160.
Examination Report dated Aug. 25, 2011 issued for Chinese Application No. CN201010176686.1.
Canadian Office Action dated Aug. 24, 2012, received for Canadian Application Serial No. 2,693,710.

(Continued)

*Primary Examiner* — Ramsey Refai
(74) *Attorney, Agent, or Firm* — Jose Gutman; Fleit Intellectual Property Law (57) ABSTRACT

A method, electronic device, and computer readable storage medium, for capturing user inputs in a fillable electronic form into an electronic wallet. A method includes: populating fields in a fillable electronic form with secured information from record fields in an electronic wallet at the electronic device while in an online transaction with an online vendor's server; receiving user input entering changes into the fields in the fillable electronic form overwriting the secured information to changed information in the fillable electronic form; upon determining that changes have been made in any field in the fillable electronic form, copying the changed information from the fields in the fillable electronic form and writing the changed information into corresponding record fields as secured information in the electronic wallet; and continuing with the online transaction using the fillable electronic form with the online vendor's server.

20 Claims, 7 Drawing Sheets

(56) References Cited

U.S. PATENT DOCUMENTS

| | | | |
|---|---|---|---|
| 6,697,839 B2* | 2/2004 | Sini | G06F 17/243 709/203 |
| 6,873,974 B1* | 3/2005 | Schutzer | G06Q 20/10 235/379 |
| 7,062,258 B1* | 6/2006 | Sini | G06F 17/243 455/414.1 |
| 7,069,271 B1* | 6/2006 | Fadel | G06Q 10/00 705/26.62 |
| 7,200,577 B2* | 4/2007 | Zissimopoulos | G06Q 20/027 705/41 |
| 7,231,229 B1 | 6/2007 | Hawkins et al. | |
| 7,343,351 B1 | 3/2008 | Bishop et al. | |
| 8,423,408 B1* | 4/2013 | Barnes | G06Q 30/02 455/414.2 |
| 2001/0051915 A1* | 12/2001 | Ueno | G06Q 20/04 705/39 |
| 2002/0103827 A1* | 8/2002 | Sesek | G06F 17/243 715/224 |
| 2002/0166118 A1 | 11/2002 | Kovan et al. | |
| 2003/0096596 A1 | 5/2003 | Sini et al. | |
| 2004/0243520 A1 | 12/2004 | Bishop et al. | |
| 2005/0187873 A1* | 8/2005 | Labrou | G06Q 20/02 705/40 |
| 2008/0048022 A1* | 2/2008 | Vawter | G06Q 20/32 235/380 |
| 2008/0259045 A1 | 10/2008 | Kim | |
| 2009/0104888 A1* | 4/2009 | Cox | G06F 21/31 455/410 |
| 2009/0233579 A1* | 9/2009 | Castell | G06Q 20/105 455/411 |
| 2009/0288012 A1* | 11/2009 | Hertel | G06Q 20/02 715/738 |
| 2012/0042045 A1* | 2/2012 | Takayama | G06Q 20/04 709/218 |
| 2013/0346302 A1* | 12/2013 | Purves | G06Q 20/102 705/40 |

OTHER PUBLICATIONS

Chinese Office Action dated May 31, 2012, received for Chinese Application No. 201010176686.1.
Chinese Office Action dated Dec. 24, 2012, received for Chinese Application No. 201010176686.1.
Extended European Search Report dated Aug. 5, 2009 for European Application Serial No. 09153764.7.
Canadian Office Action dated Nov. 14, 2013, received for Canadian Application Serial No. 2,693,710.
European Application Serial No. 09153764.7, Examination Notification Art. 94(3) dated Aug. 18, 2014.
Canadian Office Action dated Dec. 2, 2014, received for Canadian Application Serial No. 2,693,710.
Decision to refuse a European Patent application issued for EP Application No. 09153764.7 dated Apr. 4, 2019.

* cited by examiner

CLIENT BILLING INFORMATION — 602
604

Last Name:
First Name:
610

Billing Address:
606  611
Street:
Apartment Number: — 612
City:
State/Province:  613
Zip/Postal Code:  614
Country:  615
620
616

Shipping Address:  621
Same as Billing:  622
Street:  623
Apartment Number:
City:
State/Province:  624
Zip/Postal Code:  625
630
Country:  626
627

Credit Card:  631
Credit Card Type:  632
Credit Card Number:
Expiry: Month:  Year:
Verification Code:  633  634

Telephone:  635

Update Electronic Wallet? — 650
651
600B
Enter Security PIN to update:
Confirm Overwrite?  or  Save As:
FIG. 6B
652  653

FIG. 7

SYSTEM AND METHOD FOR CAPTURING USER INPUTS IN ELECTRONIC FORMS

FIELD OF THE DISCLOSURE

The present disclosure relates generally to electronic forms, and a system and method for capturing user inputs made in those forms.

BACKGROUND

Currently, there are a number of ways in which online transactions may be made via a wireless handheld device. For example, using an Internet browser, a user of the wireless handheld device may browse an online store, and the store may allow the user to create a name/password and to save the credit card information at the online store for future purchases.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

As noted above, the present disclosure relates to a system and method for making electronic payments.

Figure 1:
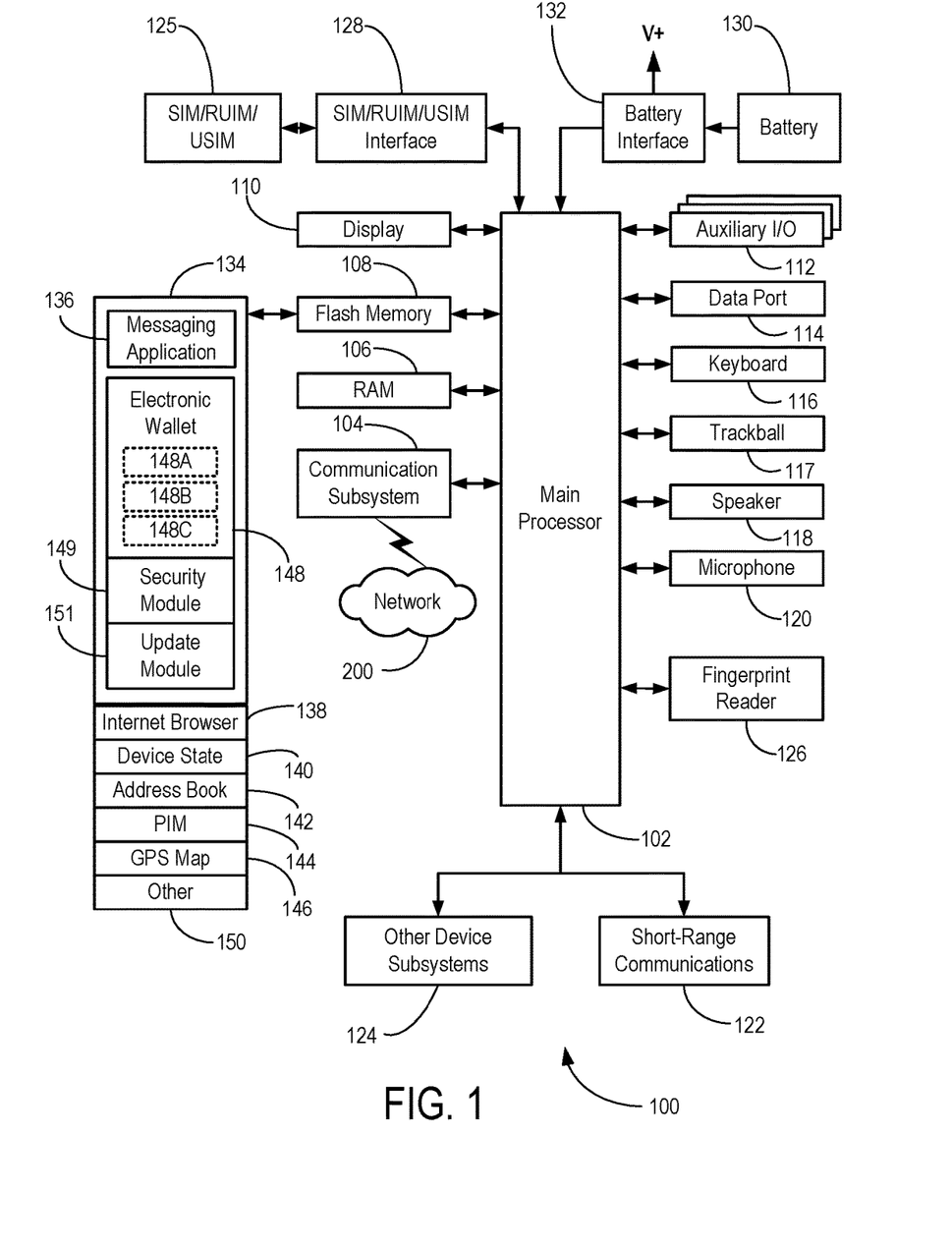
FIG. 1 is an illustration of a device in accordance with an embodiment.

In an illustrative embodiment, the system and method may be practiced with a wireless handheld device in a wireless operating environment. Shown in FIG. 1 is a schematic block diagram of an illustrative wireless handheld device 100. The wireless handheld device 100 may comprise a number of components, including a main processor 102 which controls the overall operation of wireless handheld device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, other device subsystems 124, and a fingerprint reader module 126.

Some of the subsystems of the wireless handheld device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The wireless handheld device 100 may send and receive communication signals over the wireless network 200 after required network registration or activation procedures have been completed. Network access may be associated with a subscriber or user of the wireless handheld device 100.

The wireless handheld device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the wireless handheld device 100. The battery 130 may be used to power all components and modules in the wireless handheld device 100.

The main processor 102, in addition to its operating system functions, enables execution of various software applications 134 on the wireless handheld device 100. A subset of software applications 134 that control basic device operations, including data and voice communication applications, will normally be installed on the wireless handheld device 100 during its manufacture.

The software applications 134 may include a messaging application 136. The messaging application 136 can be any suitable software program that allows a subscriber or user of the wireless handheld device 100 to send and receive wireless text communications. Various alternatives exist for the messaging application 136 as is well known to those skilled in the art. Messages that have been sent or received by the user are typically stored in local storage such as flash memory 108 of the wireless handheld device 100, or in some other suitable storage element in the wireless handheld device 100. In an alternative embodiment, some of the sent and received messages may be stored remotely from the wireless handheld device 100 such as in a data store of an associated host system that the wireless handheld device 100 communicates with. In an embodiment, the messaging application 136 may include a Message List user interface that is configured to allow a user to see a list of message objects (i.e. email messages) in a convenient list form. This will be described in detail further below.

Still referring to FIG. 1, wireless handheld device 100 may include an electronic wallet 148 that may be operatively integrated with main processor 102, RAM 106, display 110, short-range communications subsystem 122, fingerprint reader module 126, or various other device subsystems 124 and software applications 134 to provide various electronic wallet application functions. Electronic wallet module 148 may include a security module 149 as well as an update module 151, which will be described in more detail further below.

The wireless handheld device 100 may further include a device state module 140, an address book 142, a Personal Information Manager (PIM) 144, and various other modules 150. Additional software applications may also be loaded onto the wireless handheld device 100 through at least one of the wireless network 200, the auxiliary I/O subsystem 112, the data port 114, the short-range communications subsystem 122, or the various other device subsystems 124.

Figure 2:
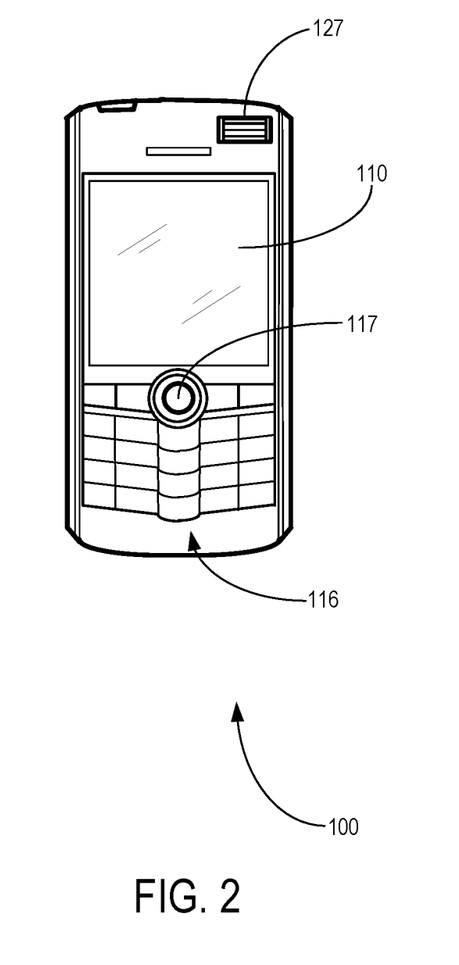
FIG. 2 is an illustrative example of a wireless handheld device that may provide an operating environment.

Now referring to FIG. 2, shown is an illustrative front view of a wireless handheld device 100 that may provide a suitable operating environment. As shown, the wireless handheld device 100 may include a display 110, a keyboard 116, and other input or navigation means such as a trackball 117, and a fingerprint reader 127 operatively connected to the fingerprint reader module 126 of FIG. 1. The display 110 may be configured to display various screens allowing the user of device 100 to view screen outputs from the various software applications 134, including the electronic wallet 148. Display 110 may also be configured to provide a touch-sensitive screen input in response to a prompt or query displayed on display 110.

Figure 3:
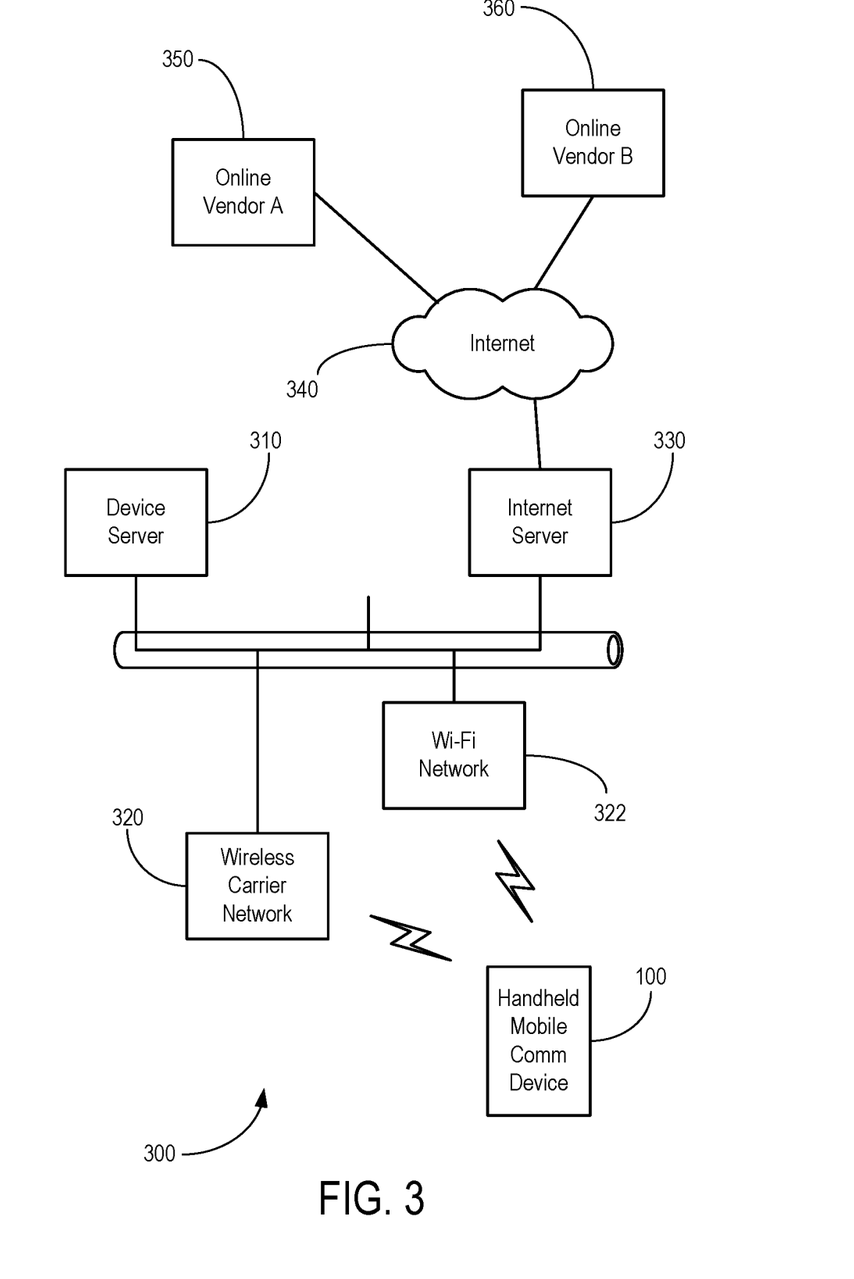
FIG. 3 is a block diagram of an illustrative example of a network environment in which various embodiments may be practiced.

Now referring to FIG. 3, shown is a schematic block diagram of an illustrative network environment 300 in which various embodiments may be practiced. As shown, network environment 300 may include a device server 310 operatively connected to the wireless handheld device 100 via a wireless carrier network 320. An Internet Service Provider (ISP) server 330 may also be provided in the network environment 300 such that a user of device 100 may access the Internet 340 from the device 100. In an embodiment, the Internet 340 may provide access to online vendors having web servers 350, 360 from which a user of wireless handheld device 100 may electronically purchase goods or services.

Figure 4:
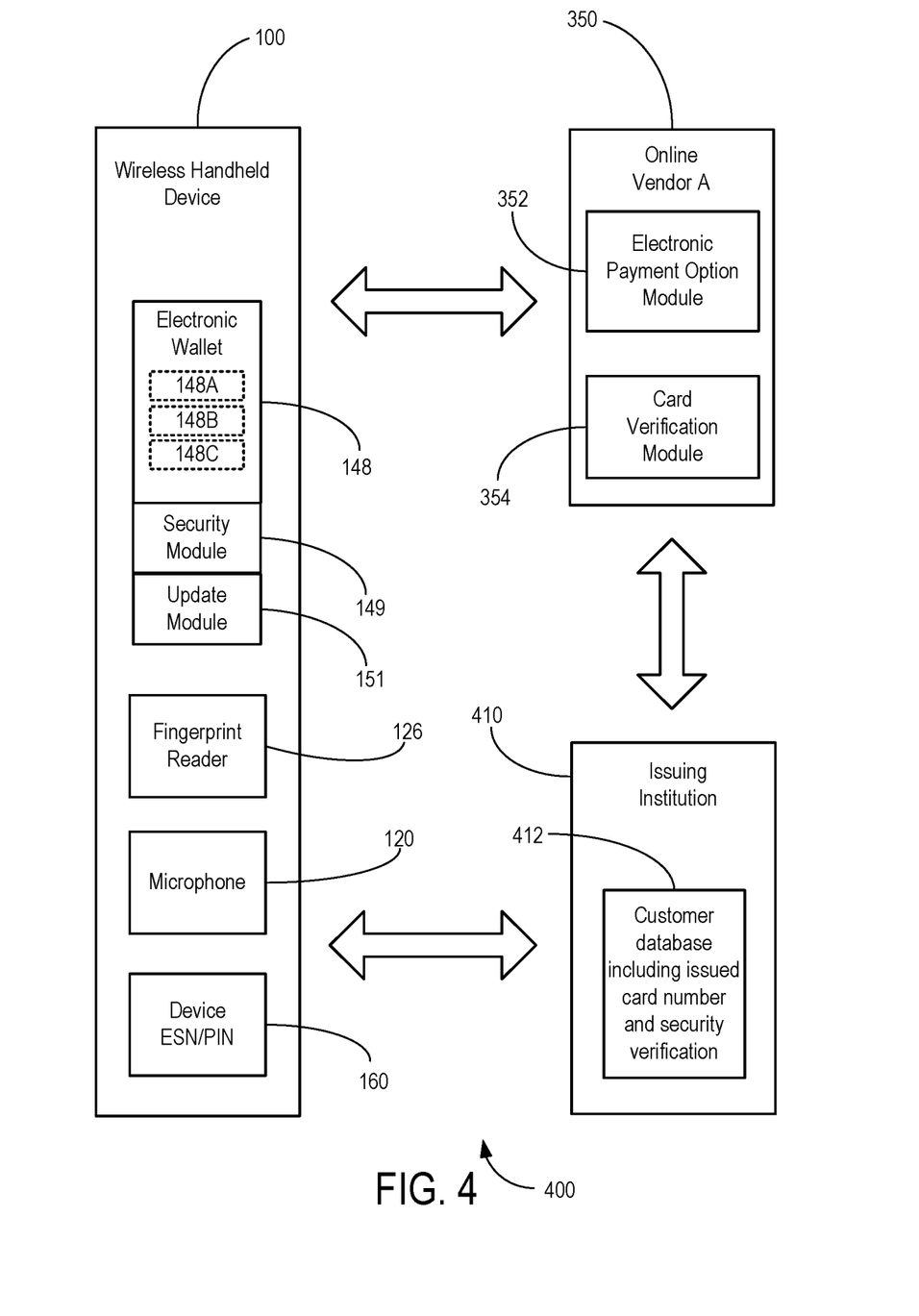
FIG. 4 and FIG. 5 are schematic block diagrams of an electronic transaction system for interaction between electronic wallet in the wireless handheld device and an online website vendor's website.
Figure 5:
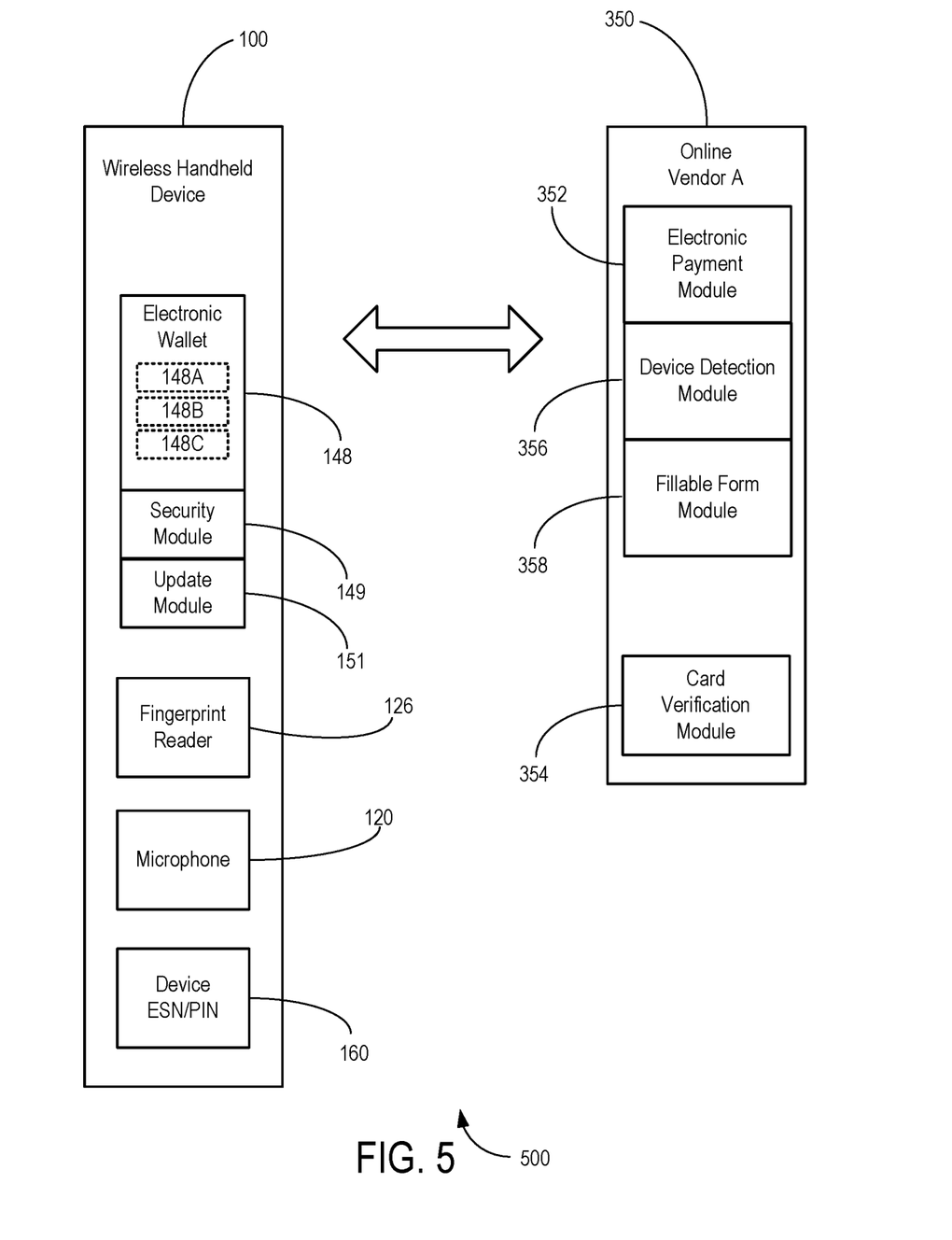

Now referring to FIG. 4 and FIG. 5, shown is are schematic block diagrams 400 and 500 of an electronic transaction system for interaction between electronic wallet 148 in wireless handheld device 100 and an online website vendor's electronic payment module 352 when wireless handheld device 100 is used to visit the website. As shown, the electronic wallet 148 may be configured to access storage means on a persistent store (e.g. flash memory 108 in FIG. 1) adapted to securely store data for one or more payment cards (e.g. credit cards or debit cards 148A, 148B, 148C) issued to the user of wireless handheld device 100. The electronic wallet may further have an associated wallet security module 149 configured to allow controlled access to the electronic wallet 148. The payment cards 148A, 148B, 148C stored in the electronic wallet 148 may be encrypted using a strong encryption algorithm, and may be made accessible by wallet security module 149 if the wallet security module 149 receives verification that the user is authorized to access the payment cards 148A, 148B, 148C.

In an embodiment, wireless handheld device 100 may include a fingerprint reader 126 operatively connected to wallet security module 149, and configured to enable authorized user access to payment cards 148A, 148B, 148C only if the fingerprint reader 126 receives a fingerprint input signal matching a previously stored fingerprint input signal from an authorized user (e.g. the main user of wireless handheld device 100).

Alternatively, or in addition, wireless handheld device 100 may include a microphone 120 which may be adapted to receive a voice input signal from a user speaking a pre-selected password or command, and comparing the received voice input signal to a previously stored input signal from the authorized user.

In an embodiment, electronic payment module 352 at the online vendor's server 350 may be suitably configured to enable purchases from the online vendor's website using the electronic wallet 148 carried within wireless handheld device 100. The electronic payment module 352 may provide a user interface viewable on display 110 (FIG. 1) of wireless handheld device 100, and various menu options and controls may be presented for selection or activation using keyboard 116 or trackball 117 (FIG. 1). In order to simplify the purchasing transaction, the electronic payment module 352 may also be configured to provide a simplified user interface allowing the user to complete a purchase with a minimal number of steps, and without requiring repeated entry of card numbers, expiration dates, and other personal information or verification data each time the user is making a purchase at the online vendor's website.

In an illustrative embodiment, the electronic wallet 148 may register as a browser plug-in for a custom content type in Internet browser 138 (FIG. 1). As a browser plug-in, support for custom content type may be indicated in the http headers to a website supporting this method of payment, and the website may return a webpage specially adapted for this payment option. If custom content types are not used, as another illustrative example, JavaScript™ commands could be used to invoke the electronic wallet 148. It will be appreciated that there are also various other ways in which an online vendor's web server 350 could instruct a browser 138 to invoke electronic wallet 148, such as meta tags and embedded mark-up.

Regardless of the particular way in which the electronic wallet 148 is invoked, the online vendor's web server 350 may be suitably adapted to recognize when a wireless handheld device 100 capable of using this payment option is visiting the online vendor's web server 350. As an illustrative example, online vendor's server 350 may include detection module 356 configured to detect when device 100 is used to access the online vendor's server 350. This may be determined, for example, from an HTML web page request issued from Internet browser 138 of device 100 which may be detected from detection module 356. In turn, fillable form module 358 may display a fillable electronic form suitable for the particular device type. While modules 352-358 are shown individually in this illustrative example, it will be appreciated that each could be a subsystem or submodule in a larger module executing on server 350.

In an embodiment, the display as presented in the Internet browser 138 on display 110 (FIG. 1) may include a link or button for payment specifically via the electronic wallet 148 provided on the wireless handheld device 100. If a user of wireless handheld device 100 clicks the payment button, an electronic payment module 352 on the online vendor's web server 350 may return a webpage to the Internet browser 138 of wireless handheld device 100 with a custom content type which may instruct the Internet browser 138 to invoke the electronic wallet application 148 and associated wallet security module 149. The returned webpage may also supply payment details, including the address to which the card information is to be sent, for payment and verification. For example, the specified address may be the issuing institution web server 410, or alternatively a payment processing server used by the online vendor for payments made at the website.

In an embodiment, upon being invoked, the wallet security module 149 may require the user to provide verification data, such as a password, fingerprint press or swipe, or voice command. Upon authorization, if a card has been preselected for use with the device-based catalogue application, electronic wallet 148 may pass all relevant card information and any verification data for processing the transaction. The user does not have to enter the card information at the online vendor's website to complete the transaction, and does not have to let the online vendor permanently store the card information on their website to achieve this.

Figure 6A:
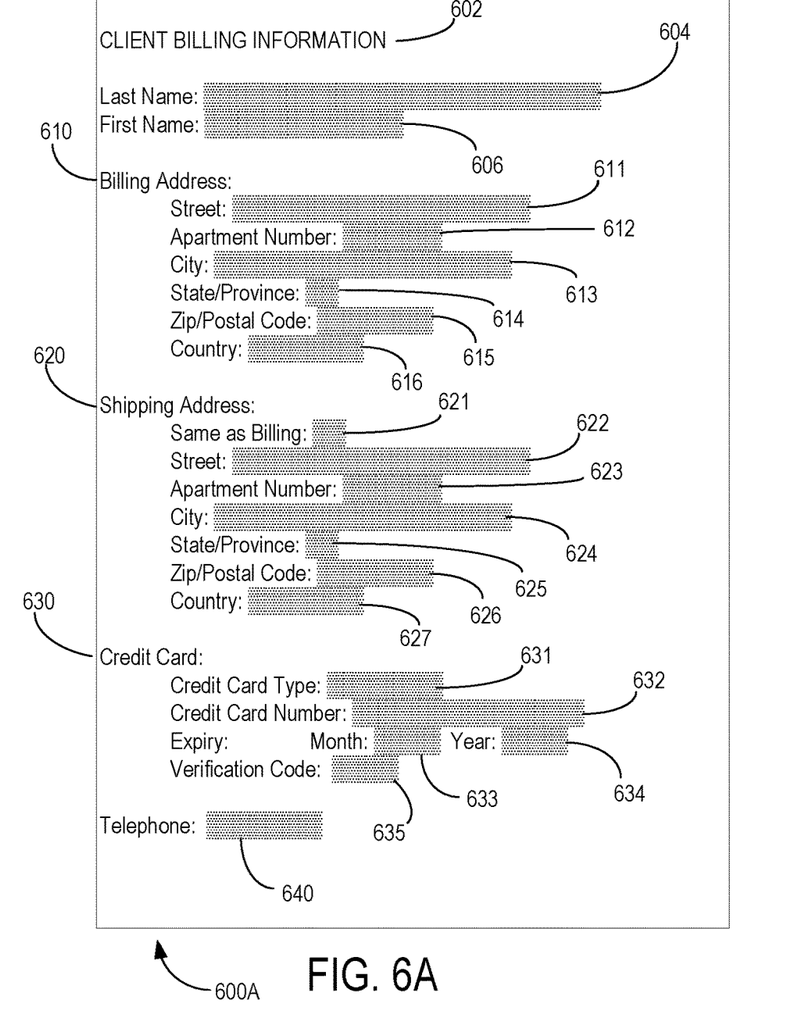
FIG. 6A is an illustrative example of such a fillable electronic form delivered to the wireless handheld device for display.

Shown in FIG. 6A is an illustrative example of such a fillable electronic form 600A delivered to device 100 for display in response to detection module 356. As shown, fillable electronic form 600A may include numerous fields for the client's billing information 602, including last name 604, first name 606; various fields 611-616 for billing address 610; various fields 621-617 for shipping address 620, if applicable; various fields 631-635 for credit card 630, and a telephone number 640. Of course, if some other type of card was being used, such as a debit card or some type of reward program card, corresponding fields may be displayed in fillable electronic form 600A.

In an embodiment, information from wallet security module 149 may be optionally passed to populate the fields in fillable electronic form 600A. Before passing any information to fillable electronic form 600A, wallet security module 149 may ask the user for valid verification data to access the electronic wallet 148, such as a password input via keypad 116, a fingerprint press or swipe input via fingerprint reader 126, and/or a voice password or command input via microphone 120. The validation of the password, fingerprint, or voice input may be performed by wallet security module 149 locally on the wireless handheld device 100 in order to authorize transmission of information from the wireless handheld device 100. Alternatively, encrypted verification data may be transmitted together with the payment card and payment information such that the encrypted verification data may be verified by the issuing institution 410 which may verify and authorize a payment request from an online vendor's card verification module (e.g. card verification module 354 of online vendor A 350) using a customer database 412.

The payment card and payment information may be encrypted in a secure format which may be decrypted only by the final payment processing facility, such as the originating payment card issuer. For example, the wireless handheld device 100 vendor and a payment card issuer may agree upon an end-to-end encryption format that would keep the payment card information secret as the payment card information passes through the online vendor's payment processing system (e.g. on the online vendor's web server). Once verified by the payment card issuer, a payment authorization code may be sent to the online vendor to confirm payment. This may significantly reduce the risk of payment card information being collected and inadvertently exposed and stolen from the online vendor's web site.

Wallet security module 149 may use the wireless handheld device 100's unique identification, such as an Electronic Serial Number (ESN) or Product Identification Number (PIN), to confirm validation and for the payment request. For example, when issuing the payment card 148A, 148B, 148C, the issuing institution 410 may specify the device ESN or PIN with which the payment card is associated. If a payment request is not originating from an authorized wireless handheld device 100, as evidenced by the ESN or PIN for example, the request for payment card verification by an online vendor's card verification module 354 may be refused. Thus, use of the unique identity of wireless handheld device 100 for verification may further enhance protection for cards carried in electronic wallet 148.

If the wireless handheld device 100 is also configured as a mobile telephone, then the telephone number assigned to the wireless handheld device 100 may also be used to confirm authorized access, either alone, or in conjunction with the device ESN or PIN. If the telephone number of the wireless handheld device 100 is provided along with the payment card and payment information, a call back to the telephone number may be used for further verification of the identity of the user (e.g. to ask for a password, code or confirm other personal information such as address, postal code, mother's maiden name).

Once valid verification data has been input by the user, the user may be presented with a list of available payment options for selection. When displayed as selectable payment options, the card numbers could be fully revealed, partially hidden (e.g. 4500 xxxx xxxx 4742), or could simply be listed by the issuing institution's name (e.g. XYZ Bank VISA™ Credit Card). Upon selection, card information for the selected card may be sent from the electronic wallet 148 to automatically populate the fields (as listed above) in fillable electronic form 600A.

In an embodiment, once the fields are populated with information sent from the electronic wallet, the user may wish to make a change to some of the values in some of the fields. For example, the user may have recently moved and the billing address may need to be updated. In this case, the user may enter the changes in electronic fillable form 600A by overwriting whatever values are provided in fields 611-616. Alternatively, while the billing address has stayed the same, the user may wish to change the shipping address information in fields 621-627. The telephone number may also be updated in field 640, for example.

In another embodiment, fields in the fillable electronic form 600A may be filled manually by a user, without the fields being populated first using information from the electronic wallet 148. This may occur, for example, if a user is filling out a form at an online vendor's website for the first time, as the information does not exist in electronic wallet 148 in order to populate the fillable electronic form 600A.

In an embodiment, the amended or new values entered into the fields of fillable electronic form 600A may be transmitted back to update electronic wallet 148 such that information stored in electronic wallet 148 is automatically updated. This is possible because the fillable electronic form 600 is selected specifically for the device 100, and there is a one-to-one correspondence between each field in fillable electronic form 600 and information stored in electronic wallet 148. Therefore, values entered into the fields in fillable electronic form 600 may be copied back to the corresponding record field in electronic wallet 148 as will now be described.

In order to strictly control the updating of information in electronic wallet 148, update module 151 may engage security module 149 to require any one of the security mechanisms described above to be used to confirm that the user wishes to update the information already in electronic wallet 148. For example, wallet security module 149 may ask the user for valid verification data such as a password input via keypad 116, a fingerprint press or swipe input via fingerprint reader 126, and/or a voice password or command input via microphone 120.

In another embodiment, in the case of amended values, rather than writing over the original information in electronic wallet 148, the user may be given the option to store the amended values together with other information as another version. This allows the user to store information in fillable electronic form 600 that may be temporary, or that may apply only to a particular online vendor's website, without deleting the original information.

Figure 6B:
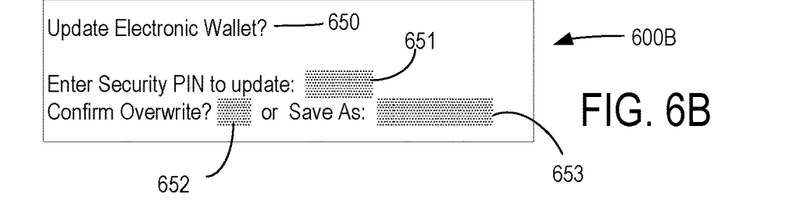
FIG. 6B is an illustrative example of an authorization request screen.

As an illustrative example, FIG. 6B shows a window 600B under control of electronic wallet 148 that may appear when the user attempts to transmit the changes to the electronic wallet 148. As shown, window 600B asks the user whether user wishes to "Update Electronic Wallet?" at 650. A field to enter a security PIN is provided at 651. Window 600B may also provide an option to overwrite existing information in electronic wallet 148 at 652, or to save the amended information as another version under a different name entered at field 653. As window 600B is under control of electronic wallet 148 (i.e. controlled by update module 151 and security module 149), PIN information entered at field 651 is secure. Alternatively, instead of providing the user with the option to overwrite existing information, update module 151 may just automatically save the amended information as a new version.

In another embodiment, when values in only certain fields in the fillable electronic form 600 have changed, only those values that have been updated may be transmitted from the fillable electronic form 600 to the electronic wallet 148.

In another embodiment, rather than having a common format for the fillable electronic form 600A for all online vendor websites, each online vendor website may have a unique fillable electronic form 600A customized for that particular online vendor. In this case, there may be multiple versions of credit card information stored in the electronic wallet 148, such that a particular version of the information may be provided each time a user visits a particular online website.

Figure 7:
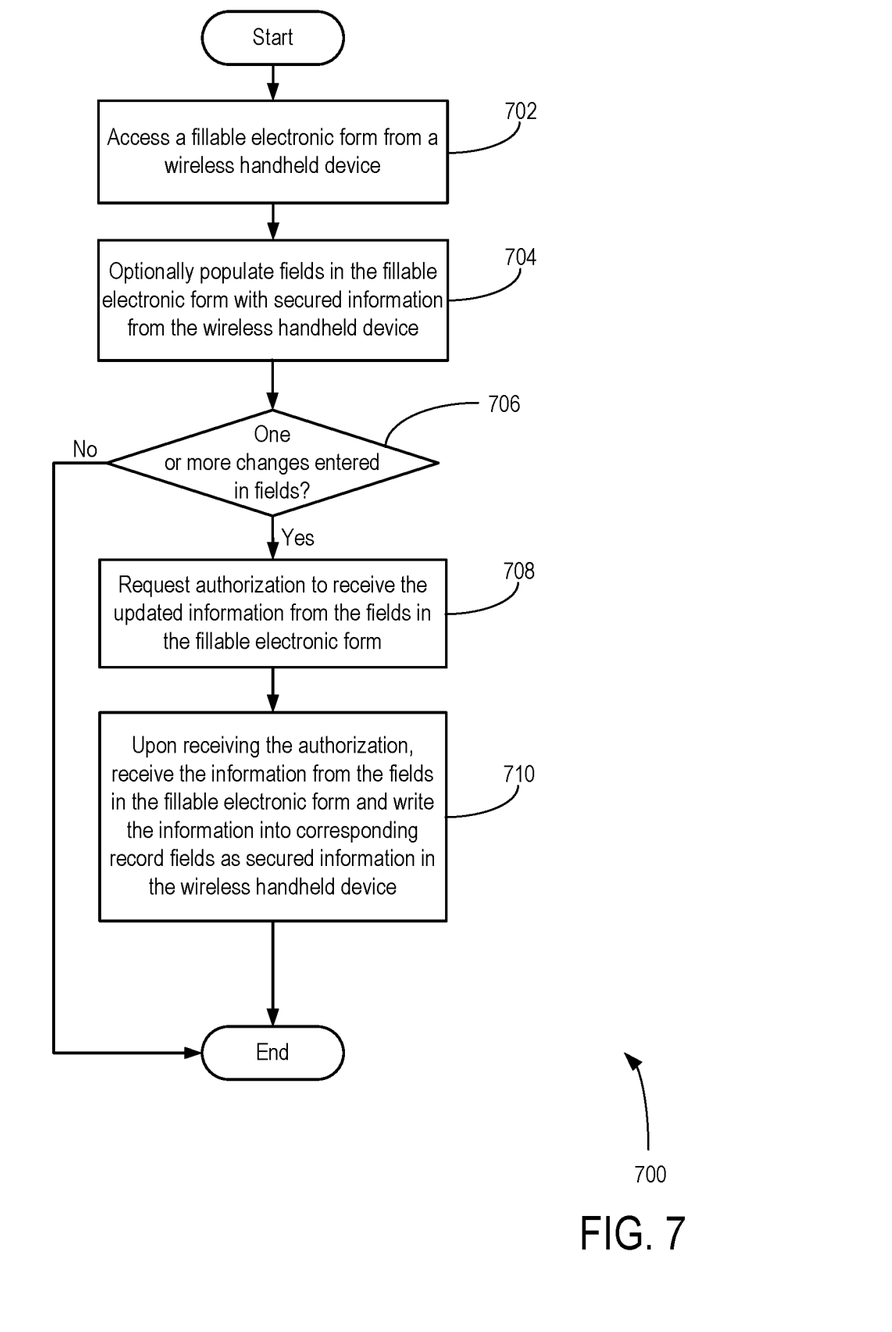
FIG. 7 is an illustrative method in accordance with an embodiment.

Now referring to FIG. 7, shown is an illustrative method 700 in accordance with an embodiment. As shown, method 700 begins at block 702 method 700 accesses a fillable electronic form from a wireless handheld device.

Next, at block 704, method 700 populates fields in the fillable electronic form with secured information from the wireless handheld device. As described above, the secured information is contained within an electronic wallet.

Next, at block 706, method 700 determines whether one or more changes have been entered into any field in the fillable electronic form. If no, method 700 ends. If yes, method proceeds to block 708 and requests authorization to receive the updated information from the fields in the fillable electronic form. The authorization may be, for example, a password or PIN, or a fingerprint, or a voice input via microphone by the user.

Method 700 then proceeds to block 710 where, upon receiving the authorization, method 700 receives the information from the fields in the fillable electronic form and writes the information into corresponding record fields as secured information in the wireless handheld device. As described above, method 700 may overwrite the original secured information stored in the electronic wallet, or alternatively may write the updated information as a different version. Method 700 then ends.

As will be appreciated, with the system and method described above, amended information entered into a fillable electronic form on a web server may be captured and copied back to an electronic wallet 148 in a secure manner, with user authorization to update the information. This solution requires the user to only enter amended information in a fillable electronic form once, and to copy any amended information back to the electronic wallet either to overwrite the original information or to save as alternate information, which may be temporary.

Thus, in an aspect, there is provided a method of capturing user inputs in a fillable electronic form into an electronic wallet, comprising: accessing the fillable electronic form; upon determining whether one or more changes have been made in any field in the fillable electronic form, requesting authorization to receive information from the fields in the fillable electronic form to update the secured information in the electronic wallet; and upon receiving the authorization, receiving the information from the fields in the fillable electronic form and writing the information into corresponding record fields as secured information in the electronic wallet.

In an embodiment, the method further comprises populating fields in the fillable electronic form with secured information from the electronic wallet.

In another embodiment, the method further comprises overwriting the secure information in the electronic wallet with the information from the fields in the fillable electronic form.

In another embodiment, the method further comprises writing the information from the fields in the fillable electronic form as another version of the secure information in the electronic wallet.

In another embodiment, the method further comprises receiving a form of authorization to populate the fields in the fillable electronic form with the secured information from the electronic wallet.

In another embodiment, the method further comprises receiving a form of authorization to receive information from the fields in the fillable electronic form to update the secured information in the electronic wallet.

In another embodiment, the authorization is one or more of a password or a fingerprint or a voice input via microphone.

In another embodiment, the method further comprises requesting the authorization to receive information locally from the wireless handheld device.

In another aspect, there is provided a wireless handheld device for capturing user inputs in a fillable electronic form into an electronic wallet, the wireless handheld device adapted to: access the fillable electronic form; upon determining whether one or more changes have been made in any field in the fillable electronic form, request authorization to receive information from the fields in the fillable electronic form to update the secured information in the electronic wallet; and upon receiving the authorization, receive the information from the fields in the fillable electronic form and writing the information into corresponding record fields as secured information in the electronic wallet.

In an embodiment, the device is further adapted to populate fields in the fillable electronic form with secured information from the electronic wallet.

In another embodiment, the device is further adapted to overwrite the secure information in the electronic wallet with the information from the fields in the fillable electronic form.

In another embodiment, the device is further adapted to write the information from the fields in the fillable electronic form as another version of the secure information in the electronic wallet.

In another embodiment, the device is further adapted to receive a form of authorization to populate the fields in the fillable electronic form with the secured information from the electronic wallet.

In another embodiment, the device is further adapted to receive a form of authorization to receive information from the fields in the fillable electronic form to update the secured information in the electronic wallet.

In another embodiment, the authorization is one or more of a password or a fingerprint or a voice input via microphone.

In another embodiment, the device is further adapted to request the authorization to receive information locally from the wireless handheld device.

In another aspect, there is provided a computer readable medium storing computer code that when loaded into a wireless handheld device adapts the device to capture user inputs in a fillable electronic form into an electronic wallet, the computer readable medium including: code for accessing the fillable electronic form from a wireless handheld device; code for requesting authorization to receive information from the fields in the fillable electronic form to update the secured information in the electronic wallet upon determining whether one or more changes have been made in any field in the fillable electronic form; and code for receiving the information from the fields in the fillable electronic form and writing the information into corresponding record fields as secured information in the electronic wallet upon receiving the authorization.

In an embodiment, the computer readable medium further comprises code for populating fields in the fillable electronic form with secured information from the electronic wallet.

In another embodiment, the computer readable medium further comprises code for overwriting the secure information in the electronic wallet with the information from the fields in the fillable electronic form.

In another embodiment, the computer readable medium further comprises code for writing the information from the fields in the fillable electronic form as another version of the secure information in the electronic wallet.

While illustrative embodiments have been described above, it will be appreciated that various changes and modifications may be made. More generally, the scope of the invention is defined by the following claims.

What is claimed is:

1. A method, at an electronic device, of capturing user inputs both in a fillable electronic form and in an electronic wallet at the electronic device, comprising:
    providing an electronic wallet in an electronic device, the electronic wallet including persistent storage in the electronic device, securely storing data associated with payment account and personal information corresponding to a user;
    displaying, at a display device of the electronic device, a user interface at least in part provided from an online vendor's website server;
    receiving, at a user input device of the electronic device, user input requesting to make payment to complete an online purchase transaction with the online vendor's website server;
    displaying, at the display device of the electronic device, a fillable electronic form received from the online vendor's website server while in an online purchase transaction with the online vendor's website server;
    populating, by the electronic wallet, one or more fields in the fillable electronic form with secured information from record fields stored in the persistent storage in the electronic wallet in the electronic device;
    receiving, in the fillable electronic form at the electronic device, user input entering one or more changes into the one or more fields in the fillable electronic form overwriting the secured information to changed information in the fillable electronic form;
    upon determining, with the electronic wallet, that one or more changes have been made by the user input entered in any field in the fillable electronic form, requesting authorization to transfer changed information from the one or more fields in the fillable electronic form to the electronic wallet to update the secured information stored in the persistent storage in the electronic wallet;
    upon receiving user input providing the authorization, copying the changed information from the one or more fields in the fillable electronic form and writing the changed information into corresponding record fields as secured information stored in the persistent storage in the electronic wallet; and
    continuing, after the receiving the user input providing the authorization, with the online purchase transaction using the fillable electronic form with the online vendor's website server to make payment to complete the online purchase transaction.

2. The method of claim 1, wherein the requesting authorization to transfer changed information from the one or more fields in the fillable electronic form to the electronic wallet, comprises displaying a prompt on the display; and
    wherein the receiving the authorization to transfer changed information from the one or more fields in the fillable electronic form to the electronic wallet, comprises receiving user input at the user interface thereby receiving the authorization.

3. The method of claim 2, wherein the receiving user input comprises receiving a fingerprint at a fingerprint reader device thereby receiving the authorization.

4. The method of claim 2, wherein the receiving user input comprises receiving a voice input via microphone in the user interface thereby receiving the authorization.

5. The method of claim 2, wherein the displaying the prompt on the display comprises displaying a field to enter a security PIN, and wherein the receiving user input comprises receiving a password entered into the displayed field using a keyboard in the user interface.

6. The method of claim 1, further comprising overwriting secure information in the corresponding record fields in the electronic wallet with the changed information copied from the fields in the fillable electronic form.

7. The method of claim 1, further comprising writing the changed information copied from the fields in the fillable electronic form into the corresponding record fields as another version of the secure information in the electronic wallet, without overwriting secure information stored in the electronic wallet with the changed information.

8. The method of claim 1, further comprising:
   requesting, prior to the populating, authorization to populate the one or more fields in the fillable electronic form with the secured information from record fields in the electronic wallet at the electronic device; and
   upon receiving the authorization to populate, performing the populating of the one or more fields in the fillable electronic form with the secured information from record fields in the electronic wallet.

9. A wireless handheld device capable of capturing user inputs both in a fillable electronic form and in an electronic wallet, the wireless handheld device comprising:
   a processor;
   a wireless communications subsystem operatively coupled with the processor;
   a user interface including a display and a user input device, the user interface operatively coupled with the processor;
   memory operatively coupled with the processor, the memory comprising persistent storage;
   an electronic wallet, operatively coupled with the processor and the memory, the electronic wallet including the persistent storage securely storing data associated with payment account and personal information corresponding to a user; and
   wherein the processor, responsive to executing computer instructions, performing the following operations:
      displaying, at the display of the electronic device, a user interface at least in part provided from an online vendor's website server;
      receiving, at a user input device of the electronic device, user input requesting to make payment to complete an online purchase transaction with the online vendor's website server;
      displaying, at the display, a fillable electronic form received from the online vendor's website server while the wireless handheld device is in an online transaction with the online vendor's website server;
      populating, by the electronic wallet, one or more fields in the fillable electronic form with secured information from record fields stored in the persistent storage in the electronic wallet;
      receiving, in the fillable electronic form at the electronic device, user input entering one or more changes into the one or more fields in the fillable electronic form overwriting the secured information to changed information in the fillable electronic form;
      upon determining, with the electronic wallet, that one or more changes have been made by the user input entered in any field in the fillable electronic form, requesting authorization to transfer changed information from the one or more fields in the fillable electronic form to the electronic wallet to update the secured information stored in the persistent storage in the electronic wallet;
      upon receiving user input providing the authorization, copying the changed information from the one or more fields in the fillable electronic form and writing the changed information into corresponding record fields as secured information stored in the persistent storage in the electronic wallet; and
      continuing, after the receiving the user input providing the authorization, with the online purchase transaction using the fillable electronic form with the online vendor's website server to make payment to complete the online purchase transaction.

10. The wireless handheld device of claim 9, wherein the requesting authorization to transfer changed information from the one or more fields in the fillable electronic form to the electronic wallet, comprises displaying a prompt on the display; and
    wherein the receiving the authorization to transfer changed information from the one or more fields in the fillable electronic form to the electronic wallet, comprises receiving user input at the user input device thereby receiving the authorization.

11. The wireless handheld device of claim 10, wherein the receiving user input comprises receiving a fingerprint at a fingerprint reader device as the user input device thereby receiving the authorization.

12. The wireless handheld device of claim 10, wherein the receiving user input comprises receiving a voice input via microphone as the user input device thereby receiving the authorization.

13. The wireless handheld device of claim 10, wherein the displaying the prompt on the display comprises displaying a field to enter a security PIN, and wherein the receiving user input comprises receiving a password entered into the displayed field using a keyboard as the user input device thereby receiving the authorization.

14. The wireless handheld device of claim 9, wherein the processor, responsive to executing computer instructions, performing the following operations: overwriting secure information in the corresponding record fields in the electronic wallet with the changed information copied from the fields in the fillable electronic form.

15. The wireless handheld device of claim 9, wherein the processor, responsive to executing computer instructions, performing the following operations: writing the changed information copied from the fields in the fillable electronic form into the corresponding record fields as another version of the secure information in the electronic wallet, without overwriting secure information stored in the electronic wallet with the changed information.

16. The wireless handheld device of claim 9, wherein the processor, responsive to executing computer instructions, performing the following operations:
    requesting, prior to the populating, authorization to populate the one or more fields in the fillable electronic form with the secured information from record fields in the electronic wallet at the electronic device; and
    upon receiving the authorization to populate, performing the populating of the one or more fields in the fillable electronic form with the secured information from record fields in the electronic wallet.

17. A non-transitory computer readable storage medium storing computer code that when loaded into a wireless handheld device adapts the device to capture user inputs both in a fillable electronic form and in an electronic wallet at the wireless handheld device, the non-transitory computer readable storage medium including computer code for the wireless handheld device performing the following operations:
    providing an electronic wallet in the wireless handheld device, the electronic wallet including persistent storage in the wireless handheld device, securely storing data associated with payment account and personal information corresponding to a user;
    displaying, at a display device of the wireless handheld device, a user interface at least in part provided from an online vendor's website server;

receiving, at a user input device of the wireless handheld device, user input requesting to make payment to complete an online purchase transaction with the online vendor's website server;

displaying, at the display device of the wireless handheld device, a fillable electronic form received from the online vendor's website server while the wireless handheld device is in an online purchase transaction with the online vendor's website server;

populating, by the electronic wallet, one or more fields in the fillable electronic form with secured information from record fields stored in the persistent storage in the electronic wallet in the wireless handheld device;

receiving, in the fillable electronic form at the wireless handheld device, user input entering one or more changes into the one or more fields in the fillable electronic form overwriting the secured information to changed information in the fillable electronic form;

upon determining, with the electronic wallet, that one or more changes have been made by the user input entered in any field in the fillable electronic form, requesting authorization to transfer changed information from the one or more fields in the fillable electronic form to the electronic wallet to update the secured information stored in the persistent storage in the electronic wallet;

upon receiving user input providing the authorization, copying the changed information from the one or more fields in the fillable electronic form and writing the changed information into corresponding record fields as secured information stored in the persistent storage in the electronic wallet; and continuing, after the receiving the user input providing the authorization, with the online purchase transaction using the fillable electronic form with the online vendor's website server to make payment to complete the online purchase transaction.

18. The computer readable storage medium of claim 17, wherein the requesting authorization to transfer changed information from the one or more fields in the fillable electronic form to the electronic wallet, comprises displaying a prompt on the display;

wherein the receiving the authorization to transfer changed information from the one or more fields in the fillable electronic form to the electronic wallet, comprises receiving user input at the user interface thereby receiving the authorization; and wherein the receiving user input comprises at least one of the following:
receiving a fingerprint at a fingerprint reader device thereby receiving the authorization;
receiving a voice input via microphone in the user interface thereby receiving the authorization; and
receiving a password entered into a displayed field on the display using a keyboard in the user interface.

19. The computer readable storage medium of claim 17, wherein the computer readable storage medium including computer code for the wireless handheld device performing the following operations:

overwriting secure information in the corresponding record fields in the electronic wallet with the changed information copied from the fields in the fillable electronic form.

20. The computer readable storage medium of claim 17, wherein the computer readable storage medium including computer code for the wireless handheld device performing the following operations:

writing the changed information copied from the fields in the fillable electronic form into the corresponding record fields as another version of the secure information in the electronic wallet, without overwriting secure information stored in the electronic wallet with the changed information.

* * * * *